United States Patent [19]
Phillips

[11] Patent Number: 5,154,563
[45] Date of Patent: Oct. 13, 1992

[54] WHEEL CHAIR CARRIER

[76] Inventor: J. Rodney Phillips, Rte. 4, Box 97, Fair Akers, Dublin, Va. 24084

[21] Appl. No.: 551,407

[22] Filed: Jul. 12, 1990

[51] Int. Cl.5 ............................................. B60R 9/042
[52] U.S. Cl. .................................... 414/462; 224/326; 414/921
[58] Field of Search ........................ 224/310, 319, 326; 414/462, 538, 559, 786, 921

[56]        References Cited
          U.S. PATENT DOCUMENTS

| | | | |
|---|---|---|---|
| 3,521,774 | 7/1970 | Raypholtz | 414/462 |
| 3,878,955 | 4/1975 | Udden. | |
| 4,039,096 | 8/1977 | McAllister. | |
| 4,134,509 | 1/1979 | Clement. | |
| 4,245,947 | 1/1981 | Clement | 414/462 |
| 4,376,611 | 3/1983 | Koop | 414/462 |
| 4,397,607 | 8/1983 | Neill Jr. et al. | 414/786 |
| 4,439,086 | 3/1984 | Thede | 414/462 |
| 4,484,851 | 11/1984 | Gottlieb et al. | 414/462 |
| 4,693,289 | 9/1987 | Taylor et al. | 414/462 X |
| 4,826,387 | 5/1989 | Audet | 414/462 |

FOREIGN PATENT DOCUMENTS

2158791  11/1985  United Kingdom ............... 224/326

Primary Examiner—David A. Bucci
Assistant Examiner—Janice Krizek
Attorney, Agent, or Firm—Birch, Stewart, Kolasch & Birch

[57]        ABSTRACT

A wheel chair transport assembly includes a remote winch-actuated carrier case having wheels mounted on a rear face thereof and rollable within tracks mounted to the vehicle for raising and lowering the carrier case to a storage position on the vehicle roof and an access position flush with the ground, respectively. A door provided forward of the carrier case enables an operator to insert and remove a wheel chair as necessary while conveniently seated as a driver within the vehicle.

14 Claims, 6 Drawing Sheets

WHEEL CHAIR CARRIER

BACKGROUND OF THE INVENTION

1. Field of the Invention

The present invention relates to a wheel chair carrier for a wheel chair transport assembly for those who have limited use of their legs but still have high use of their arms. More particularly, the present invention relates to a wheel chair carrier which enables the operator of the wheel chair to store the wheel chair within a carrying case, which carrying case will then, be stored on the top of a vehicle when the operator is in the driver's seat of the vehicle.

2. Description of Background Art

It has been known in the art of wheel chair carrier and storage devices to mount the wheel chair within a carrying case on the roof of a vehicle. With these types of wheel chair storage apparatuses, however, there was no guarantee that the wheel chair or wheel chair carrying case would not come into contact with a side of the automobile thereby damaging the finish of the automobile and causing potential damage to the wheel chair or the wheel chair carrying case. Further, conventional devices require the operator to secure the wheel chair to a carrier or to hooks and the like prior to lifting of the wheel chair into the storage position on top of a vehicle. This requirement is often time consuming and difficult from a maneuverability standpoint once the operator is already seated in the driver's seat of the vehicle. Further, some devices also limit use of the rear door of an automobile for four door vehicles or else are overly bulky and awkward for use in smaller or compact size cars. Finally, some conventional loading and/or lifting devices for hoisting the wheel chair to the top of the automobile do not consider the necessity of maintaining operating parts within a relatively limited space adjacent the side of the automobile, thereby preventing parking and use of those devices in a handicap parking space which is adjacent to other automobiles.

The present invention overcomes these problems found in the art by providing a wheel chair storing and transport assembly as described in the following.

SUMMARY AND OBJECTS OF THE INVENTION

Accordingly, it is a primary object of the present invention to provide a wheel chair transport assembly which prevents exterior damage to a car and potential damage to a wheel chair or its carrying case.

It is another object of the present invention to provide a wheel chair transport assembly which is easy to operate from a driver's seat of a vehicle, protects against the elements, and requires minimal maintenance by the operator.

It is a further object of the present invention to provide a wheel chair transport assembly which is easily maneuvered within the confines of a handicap parking space, even if another automobile is parked adjacent the driver's side of the automobile transporting the wheel chair.

It is a still further object of the present invention to provide a wheel chair transport assembly which is adjustable to any conventional length and width vehicle.

Further scope of applicability of the present invention will become apparent from the detailed description given hereinbelow. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawing which are given by way of illustration only, and thus are not limitative of the present invention and wherein.

DETAILED DESCRIPTION OF PREFERRED EMBODIMENTS

Figure 1:
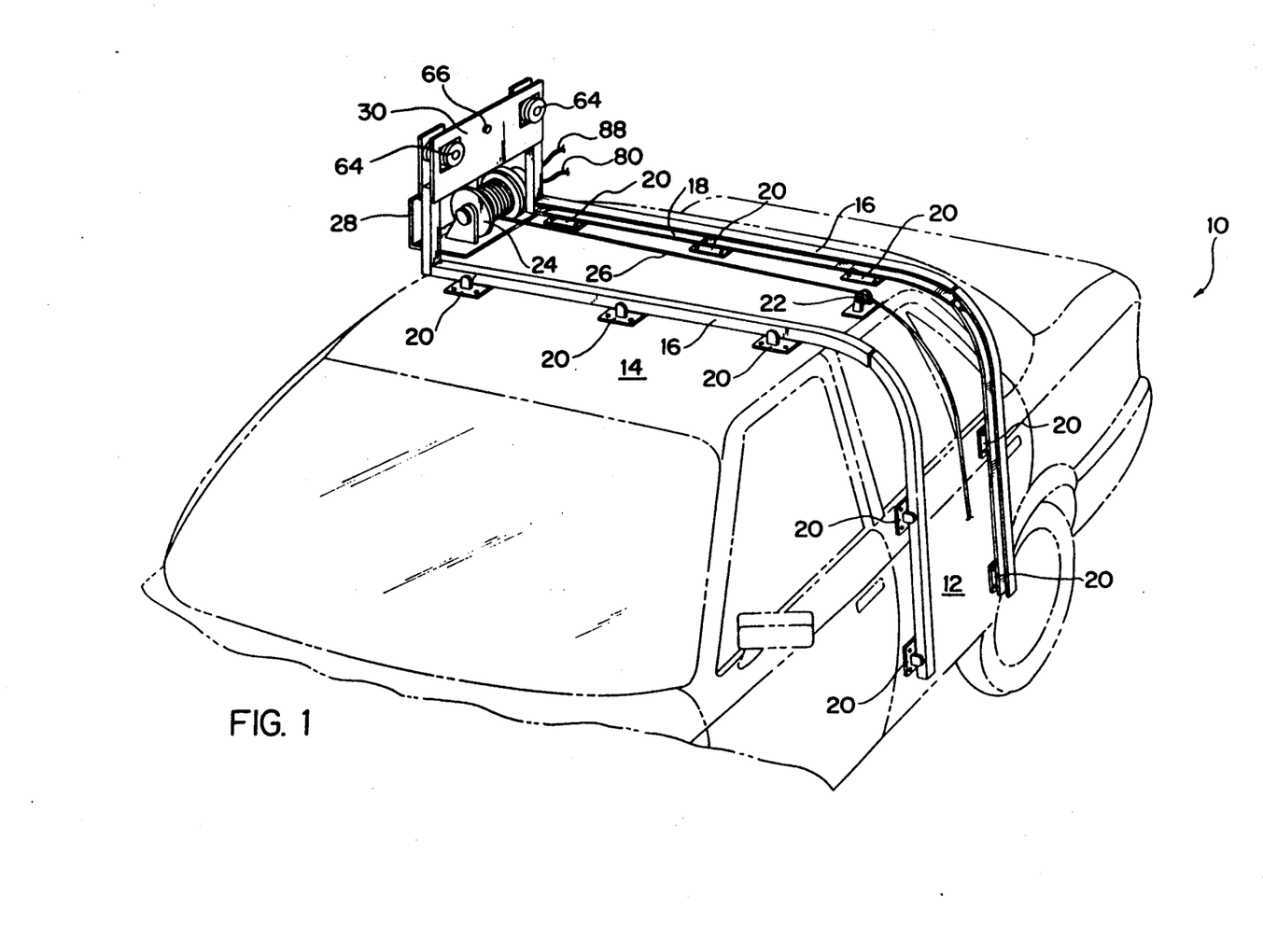
FIG. 1 is a perspective view showing a top and left side of a vehicle having a track assembly for a wheel chair transport assembly mounted on the vehicle in a first embodiment of the present invention.

FIG. 1 is a perspective view showing a top and left side of a vehicle having a track assembly for a wheel chair transport assembly mounted on the vehicle in a first preferred embodiment of the present invention.

At the outset, it should be understood that the wheel chair transport assembly of the present invention is designed for those who have limited use of their legs but still have a high degree of mobility of their arms. These are the type of individuals who are capable of driving a vehicle equipped with hand controls but are unable because of leg use limitations, to load and unload the wheel chair from the vehicle. In FIG. 1 there is shown in general a car or vehicle 10 having a rear door 12 and a roof 14 as in most conventional vehicles. It should be understood, however, that the present invention is equally applicable for use with a 2-door vehicle of a substantial length which will permit the assembly to be mounted to the rear of the driver's door thereby enabling efficient and easy operation of the device when the driver is seated in the driver's seat of the vehicle.

A pair of parallel opposing track members 16 are positioned transverse to the longitudinal direction of the car 10 at a predetermined distance apart and extend down the side door 12 to a point near the bottom of a car door as shown. Each of the tracks 16 are provided with inner grooves 18 in which wheels 34 (see FIG. 2) ride, similar to wheels rolling within tracks of a garage door. A winch 24 is provided mounted on a winch mount 28 at a point which will constitute termination of placement of a chair carrier case 32 in a storage position on the roof 14 of the vehicle 10. A winch cable 26 is provided in connection with the winch 24 and extends over a pulley member 22 wherein a distal end of the winch cable terminates at a point which enables engagement thereof with the chair carrier 32 when the chair carrier 32 is in an access position as shown in FIG. 3 at the side of the car. A stop plate 30 is provided in connection with the winch mount 28 and will be more fully described hereinbelow.

Figure 2:
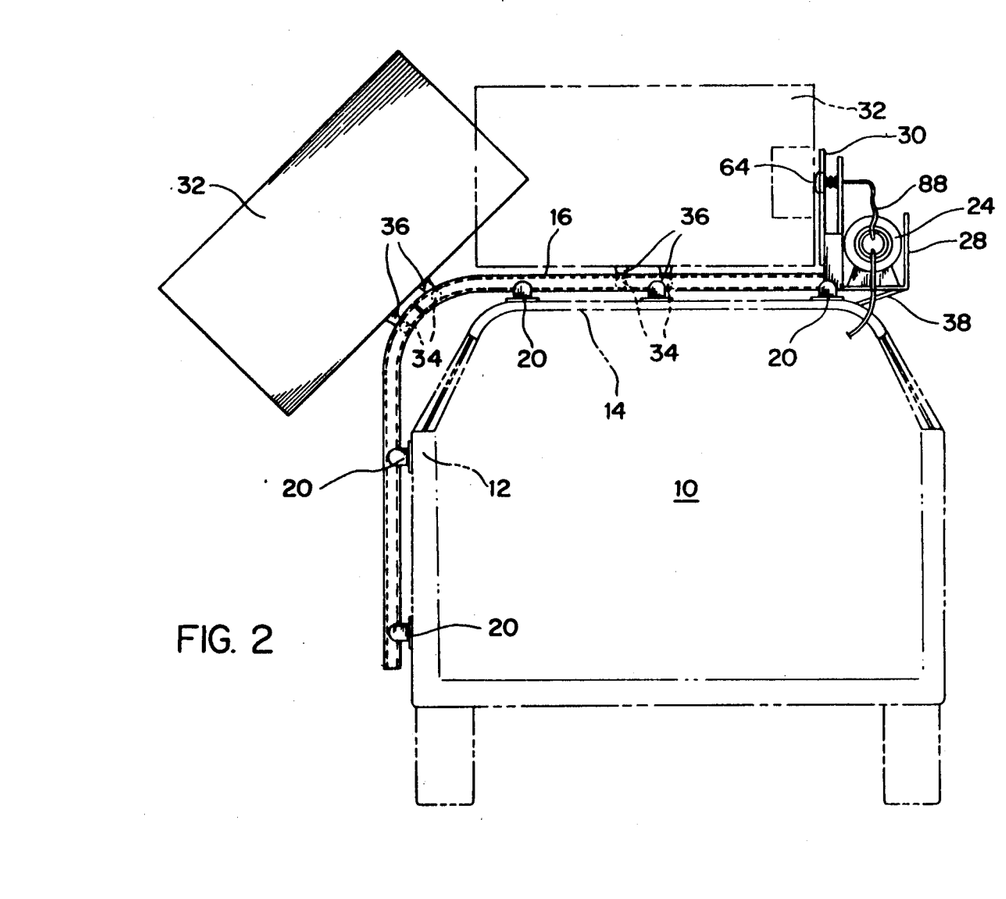
FIG. 2 is a cross-sectional side view of a carrier case movable on the track assembly of FIG. 1.
Figure 3:
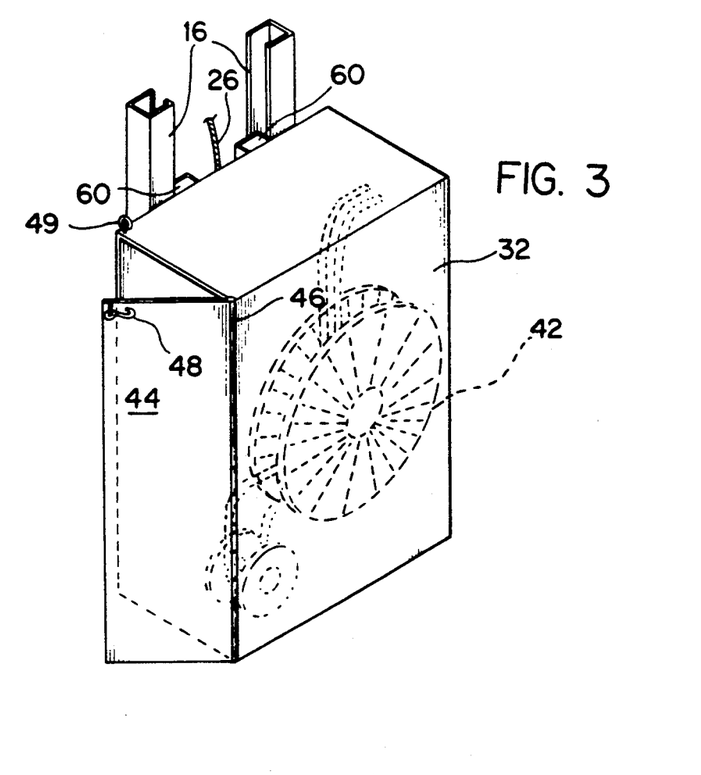
FIG. 3 is a view showing a foldable wheel chair within the carrier case of FIG. 2.

Referring now to FIG. 2, there is shown a cross-sectional side view of the chair carrier case 32 movable on the track assembly of FIG. 1. In particular, the chair carrier case 32 includes at least two of the wheel members 34 mounted on wheel mounts 36 at the rear of the chair carrier 32. Although not clearly shown in FIG. 2, the winch cable 26 is anchored to the chair carrier 32 at an appropriate position preferrably between the pair wheel members 34 in order to pull the chair carrier from an access position with a base 32(a) thereof resting on the ground to a position which will hereinafter be referred to as a storage position as shown by dashed lines in FIG. 2 against the stop plate 30 with a minimal amount of effort on the part of the winch 24. As also seen in FIGS. 1 and 2, the track members 16 are mounted on the hood 14 of the vehicle 10 and the side door 12 of the vehicle by means of right-angle mounts 20. A sufficient number of these right-angle mounts 20 should be provided in order to securely position the tracks and prevent instability thereof when the chair carrier 32 is being pulled up or dropped down along the path of the tracks 16. Also shown in FIG. 2 is a winch support bracket 38 which is provided as additional support for the winch mount 28 supporting the winch 24. This support bracket is optional and not necessary for stability if all other parts are properly mounted.

Referring now to FIG. 3, there is shown a detailed view of the wheel chair carrier case 32 of FIG. 2 having a foldable wheel chair 42 stored therein. The wheel chair carrier 32 is preferrably provided with a door 44 or similar member for preventing accidental removal of the wheel chair 42 therefrom when the chair carrier 32 is being moved from the access position to a storage position or from the storage position to an access position. The door 44 may be mounted by a piano type hinge 46 or other suitable hinge to the case itself, the hinge being of a type which will not interfere with operation of the door. A door latch 48 is provided at the top of the door 44 and case 32 for securing the door 44 in a closed position with respect to the chair carrier 32.

The wheel chair carrier 32 and door 44 may be formed of metal, reinforced fiberglass, or plastic to reduce overall weight and cost and may be of any suitable shape to render the carrier attractive or commensurate with the contours of the vehicle.

Figure 9:
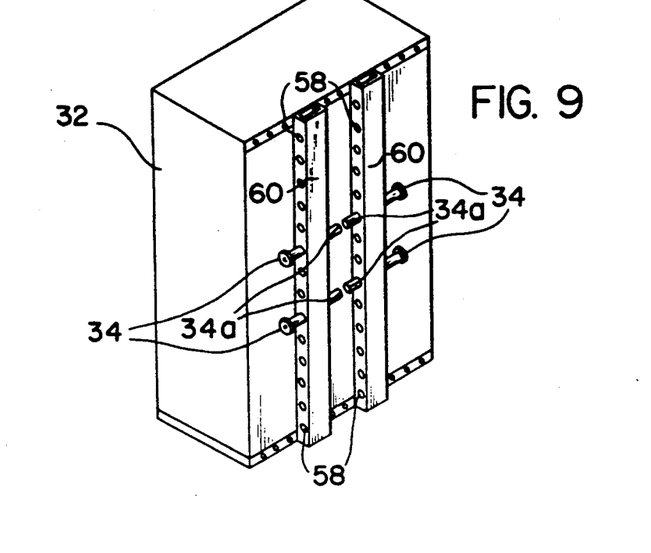
FIG. 9 is a rear view of a carrying case for use with either of the first or second preferred embodiments of the present invention.

A rear view of the chair carrier 32 is shown in FIG. 9 and includes predrilled back carrier bars 60 and predrilled framework 58 for the carrier. The wheels 34 for the carrier have shaft members 34(a) attached thereto for positioning within any one of the plurality of predrilled holes in the back carrier bars 60. This ability to adjust the position of the wheels 34 will enable an equal distribution of weight by the wheels 34 in the track members 16 with respect to the chair carrier 32 depending upon the size and weight of the wheel chair stored therein. The predrilled holes in the horizontal portions of the predrilled framework 58 enable lateral movement of the back carrier bars 60 to respond to the spaced apart position of track members 16 mounted on the vehicle in keeping with the adjustability of the overall system.

Figure 4:
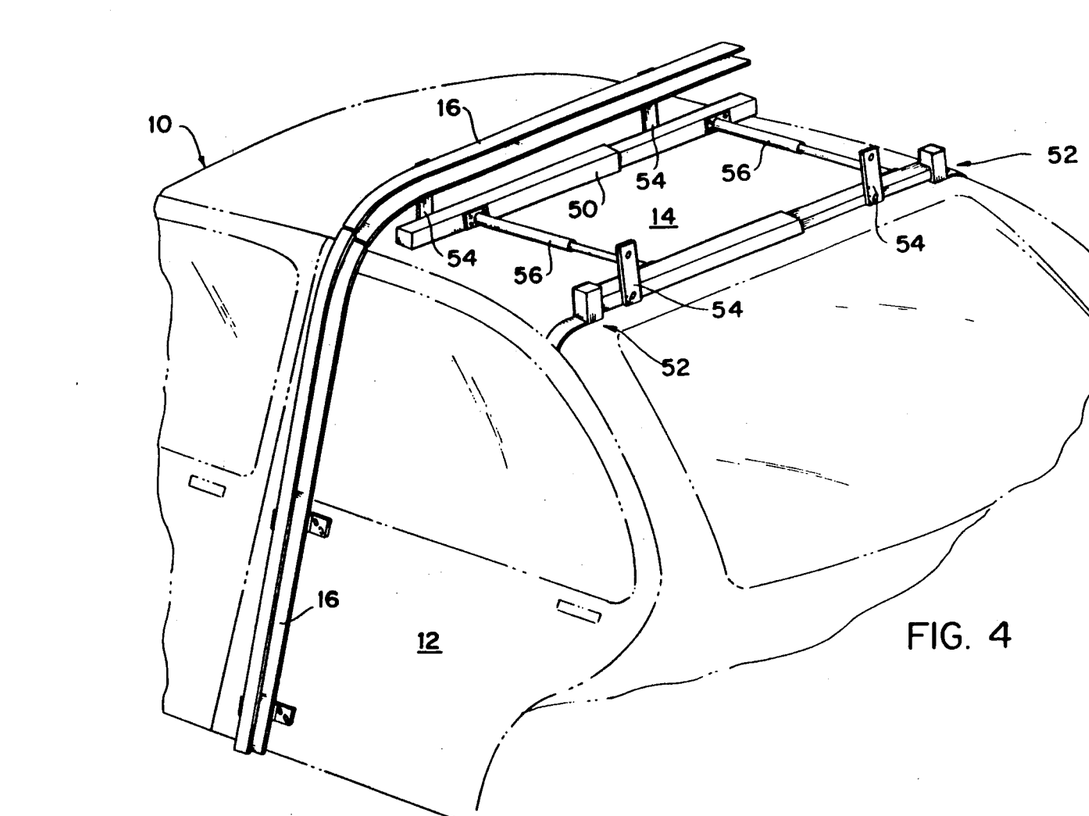
FIG. 4 is a top and left perspective view from the rear of a vehicle showing a second preferred embodiment of a track assembly for a wheel chair transport assembly mounted on the vehicle of the present invention.

Referring now to FIG. 4, there is shown a top and left perspective view from the rear of the vehicle showing a portion of a second preferred embodiment of a track assembly mounted on the vehicle of the present invention.

The track members 16 are similar to the track members described in connection with the first preferred embodiment of the present invention. Only one such track member 16 is shown in FIG. 4 in order to more clearly show the remaining features of the frame member provided therewith. Mounted on the roof 14 of the car 10 are a pair of adjustable tubes 50, such as square metal tubes, mounted by means of gutter mounts 52 at opposite sides of the vehicle 10. A similar gutter mount is provided for each opposing end of the adjustable tubing, only one such pair of mounts being shown for the purposes of clarification.

Track mounts 54 are mounted at a spaced distance apart on each of the opposing tubes 50, these track mounts being provided to support tracks 16 at a predetermined distance above the hood of the automobile. The tracks may be secured to the track mounts 54 by means of bolts, screws, rivets, or the like. Further, a pair of adjustable tubes 56, such as round metal tubes, are provided transverse to the adjustable tubes 50 and parallel to a longitudinal direction of the vehicle. These adjustable tubes 56 permit adjustment of the tracks 16 to correspond to longer or shorter car body lengths as desired. Similarly, the transversely oriented tubes 50 permit adjustment over a widthwise dimension of the vehicle thereby enabling an overall adjustable parallelogram type frame with tubes 50 and 56 which may be mounted on any size vehicle thereby permitting uniformity of mounting between vehicles with only a single assembly device.

The mounts 52 and brackets 54 for the framework in FIG. 4 are mounted with two 2¼ inch bolts for each bracket. The bolts for mounts 52 extend through the mount and exterior sheet metal and interior roof reinforcement headliner (not shown) of the vehicle. The head of the bolt is located on the mount outside of the car with the securing nut located inside of the car.

A stop plate 30 as shown in FIG. 1 on each roll bar is also used for the embodiment of FIG. 4 but has been eliminated here for simplication of the drawing.

Figure 5:
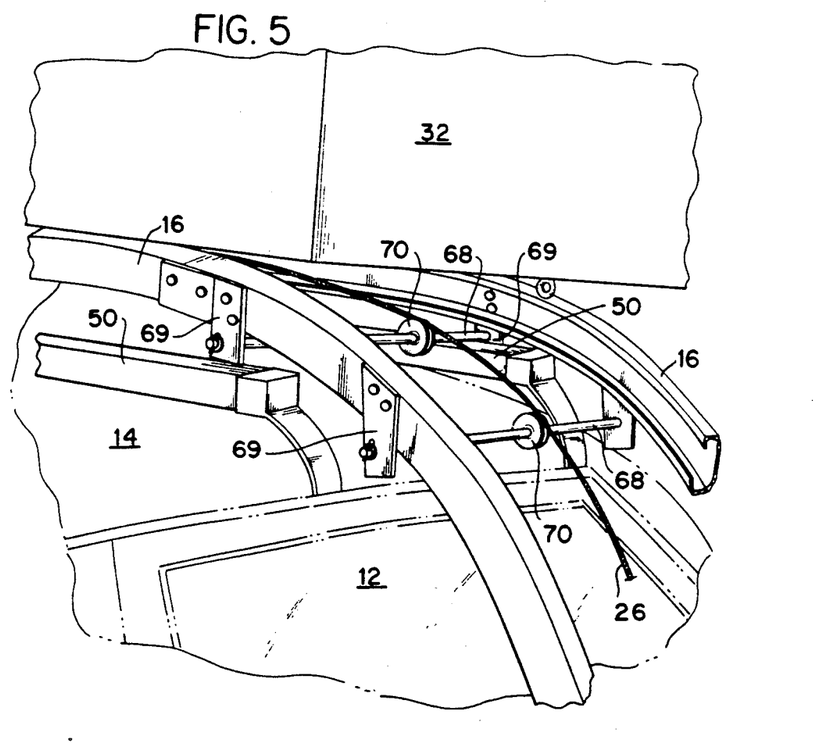
FIG. 5 is a left side perspective view showing roll bars for use in the embodiment of FIG. 4.

Referring now to FIG. 5 there is shown a left side perspective view of a pair of roll bars 68 having a single plastic roller 70 mounted on each roll bar for use in the second preferred embodiment of the present invention. Roll bars 68 in combination with rollers 70 are primarily provided in place of the pulley member 22 shown in the first embodiment and consist of two one-half inch outside diameter solid steel dowels with plastic rollers 70 mounted thereon which assist in converting vertical movement of the carrier to horizontal movement as the carrier 32 is raised to a storage position and the opposite as the carrier 32 is lowered to an access position. The two roll bars 68 are mounted by brackets 69 directly to the tracks 16 in the area in which the cable 26 must begin its vertical movement when lowering the carrier 32 or vice versa when the carrier 32 must begin its horizontal movement across the roof 14 of the vehicle when the carrier 32 is being raised. The plastic rollers 70 are stabilized on respective roll bars 68 by a washer 72, located on each side of the plastic rollers and a cotter key (not shown) inserted through a hole in the roll bars located on the outside of each washer.

Figure 6:
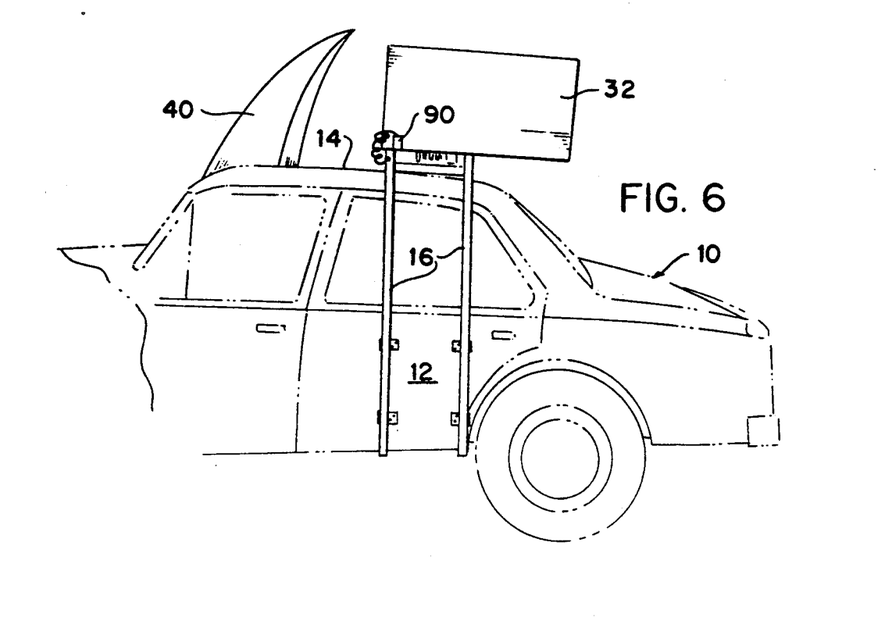
FIG. 6 is a left side view for either of the first or second preferred embodiments having an air spoiler for use in the present invention.

Referring now to FIG. 6, there is shown a left side view for either of the first or second preferred embodiments of the present invention having an air spoiler 40 provided therewith. The air spoiler 40 is provided as a means to streamline the hood surface of the vehicle and thereby increase gas mileage as compared to transport of the carrier case 32 on top of the vehicle without a spoiler. Further, the air spoiler 40 reduces the possibility of wind noise when the vehicle is traveling. Shown at 90 is a safety lock arrangement of any suitable type for securing the carrier case 32 to the vehicle in its stored position.

Figure 7:
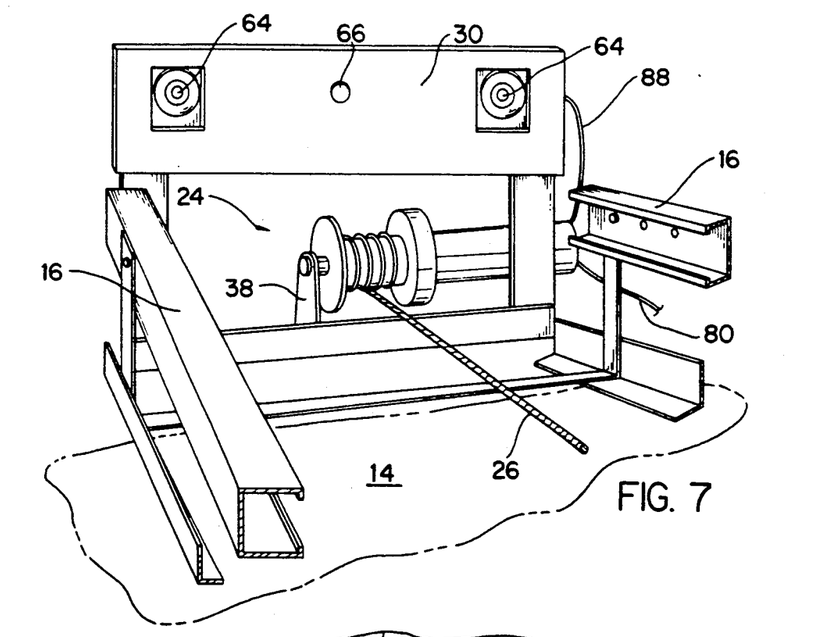
FIG. 7 is a detailed view of a stop plate with a winch provided in connection therewith for either of the first or second preferred embodiments of the present invention.
Figure 8:
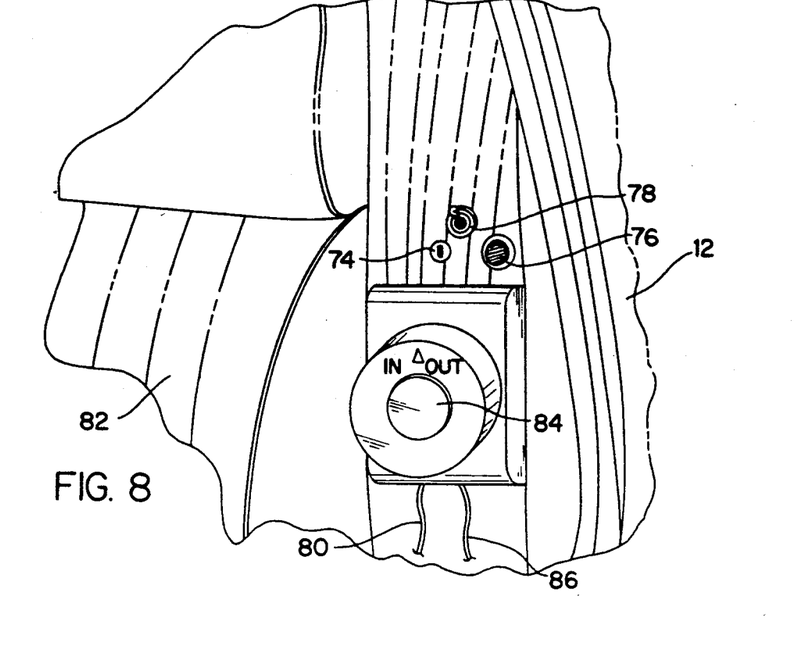
FIG. 8 is a front perspective view of a control panel for use in raising and lowering the carrier case in either of the first or second preferred embodiments of the present invention.

With respect to FIG. 7, there is shown a detailed view of a stop plate 30 with a winch 24 for either of the first or second preferred embodiments of the present invention. FIG. 8 is a detailed view of the control panel for use in operating the carrier. As shown in FIG. 7, the stop plate 30 is positioned at the terminal end of what is referred to as the storage position of the chair carrier 32. Spring members 64 are provided at two positions within the stop plate 30. A stop button 66 is also provided within the stop plate 30. The winch control panel is shown in FIG. 8 as being provided within the interior of the automobile and includes a remote switch 84 which controls up and down (cable in, cable out) movement of the winch cable 26. This panel also contains an on/off or "kill" switch 78 which disconnects electrical power to the winch in an emergency. A red indicator light 76 is also contained on this panel which extinguishes when the chair carrier 32 is in a secured storage position on the roof of the vehicle and is illuminated when the chair carrier is spaced apart from the stop plate. The light 76 will therefore illuminate at any time when the carrier is not secure. A limit switch 74 may also be used to cut electrical power when the carrier is in its stored position. The control panel 84 is electrically connected to the winch 24 via a pair of appropriate cables 80. A pair of cables 86 are also connected to a battery of the vehicle (not shown) and wire 88 connects the winch to the stop plate 30 in order to complete the circuit.

When the chair carrier 32 is at rest, it is secured against the stop plate 30 and will not move unless remotely instructed by the operator. The assembly of FIG. 7 incorporates two compression springs 64 which protrude through holes in the stop plate 30. Upon contact of the springs by a side of the chair carrier 32, the springs will begin to compress which will cause any slack to be removed from the winch cable 26. Upon full compression of the springs 64, slack will be completely removed from the winch cable 26 and the chair carrier 32 will be firmly drawn against the stop plate 30 which will restrict movement of the chair carrier 32 on top of the vehicle. When the chair carrier 32 is drawn against the stop plate 30, stop button 66 will be activated which will extinguish the red light 76 on the winch control panel 84. Extinguishing of the light 76 will alert the operator to turn off the "cable in" switch 84 and the carrier will be in its stored position. When the chair carrier 32 is moved from a storage position to an access position, the "cable out" switch 84 is activated and the compression springs 64 provide the initial impetus to move the carrier away from the stop plate 30 whereupon gravity moves the chair carrier further down the tracks 16 to the pavement or ground surface. By observation, the operator turns off the switch 84 once the carrier has made contact with the ground surface.

Accordingly, once an individual has exited the wheel chair and is seated in the driver's seat 82 of the vehicle, the user compresses the wheel chair to its folded width, pushes the wheel chair into the chair carrier 32 and closes the door 44 to secure the wheel chair within the chair carrier. The user then activates the switch 84 thereby raising the chair carrier to the top of the vehicle by the electric winch 24. Tracks 16 similar to garage door tracks are used to accommodate rollers 34 which smoothly raise the chair carrier 32 to the top of the vehicle. An automatic cut-off switch (not shown) may be located on the track to cut off the winch when the carrier reaches its stored position. When the operator desires to lower the wheel chair to the ground, switch 84 is activated to reverse the direction of the winch and the chair carrier 32 is lowered to the ground. The user pulls the wheel chair from the carrier and winches the empty carrier back to the top of the vehicle to its stored position.

The present invention is particularly useful with four door vehicles and in fact provides for a break in the track assembly 16 at positions shown in FIGS. 1, 2 and 4, wherein a first portion of the track is secured to the roof portion and a second portion of the track is secured to the door thereby enabling another passenger to open the rear door. On the other hand, if the operator prefers the rear door to be non-functional, locks and latches could be removed from the door thereby enabling a continuous track system from the roof to the side of the car as shown, for example only, in FIG. 5.

Although the adjustability features of the present invention allow application thereof to various styles and sizes of vehicles, the device is particularly applicable to 4-door vehicles or 2-door vehicles having an extended rear portion behind the driver's side of the vehicle.

In areas where temperatures fall below freezing, ice build up and frozen snow on the tracks 16 and carrier wheels 34 may sometimes render the unit non-functional. In order to melt the ice, a heat strip (not shown) such as that used to prevent pipes from freezing should be installed on the outside surface of the tracks for the entire length of tracks. This heat strip will melt ice on the track and the carrier wheels. A cover over the winch assembly would also prevent any significant build up of ice on the spool and cable wound on the spool. Any ice build up on the cable extending from the spool to the attachment point on the chair carrier should break off the cable once the cable is set in motion by the winch except in the most extreme cases of ice build up.

OPERATIONAL TESTING OF THE SYSTEM

The system has been tested on a vehicle to ensure its loading and unloading capabilities with the following results:

Loading time which includes lifting of the chair carrier from the pavement to its stored position against the stop plate is approximately 10 to 11 seconds. Unloading time involving removal of the chair carrier from the storage position to an access position adjacent the pavement is approximately 8 to 9 seconds. Stability in the stored position is quite good with no downward movement of the carrier back towards the pavement. This is because slack has been drawn out of the cable by compression springs when the winch brake is actuated. There is some slight vertical movement which is caused by carrier wheels being somewhat smaller than the inside of the tracks. Although the winch is somewhat noisy, loading and unloading of the carrier is quite smooth. When the cable out switch is activated, the compression springs provide the initial impetus to move the carrier away from the carrier rest assembly whereby gravity moves the carrier further down the tracks to the pavement. As an alternative, the remote control may move the carrier from the top of the car to slightly above the pavement at which position the door thereto may be opened and the carrier thereafter set down flush with the pavement. As indicated, the operator turns off the cable out switch once the carrier has made contact with the pavement.

To load the carrier, the operator activates the cable-in switch which enables winching of the carrier toward its stored position. Similar to the "cable out" operation, when the "cable in" switch is engaged, the carrier may be slightly raised first so that the door thereto may be more easily closed prior to completion of the "cable in" operation. Once the top of the carrier makes contact with the compression springs, slack begins to be taken out of the cable. Once the top of the carrier is pulled against the carrier assembly, a switch is activated which turns out a red indicator light and alerts the driver to turn off the "cable in" switch. If desired, the operator may kill power to the winch by flipping a toggle switch.

As also previously indicated, a safety lock may be installed on the carrier and locked into the tracks or framework to prevent the carrier from falling to the ground from its stored position.

The invention being thus described, it will be obvious that the same may be varied in many ways. Such variations are not to be regarded as a departure from the spirit and scope of the invention, and all such modifications as would be obvious to one of ordinary skill in the art are intended to be included within the scope of the following claims.

I claim:

1. A wheel chair transport assembly, comprising:
a carrier case for housing a collapsible wheel chair;
guide means mounted to and spaced a predetermined distance from a roof and one side of a vehicle for guiding said carrier case between an access position in contact with a ground surface and a storage position on the vehicle roof, said guide means conforming to exterior contours of the vehicle roof, said guide means conforming to exterior contours of the vehicle and including a pair of spaced apart parallel track members extending across the entire width of and mounted to the vehicle roof in a direction transverse to a longitudinal direction of the vehicle and mounted to one side of the vehicle to extend downwardly substantially the length of the vehicle door; and
means for transferring said carrier case between the access position and storage position along said guide means.

2. The wheel chair transport assembly according to claim 1, wherein said means for transferring includes a winch and pulley arrangement electrically actuable by an operator from an interior of the vehicle for raising and lowering said carrier case along said guide means.

3. The wheel chair transport assembly according to claim 1, wherein each of said parallel track members is comprised of two sections wherein a first section is substantially equal to the width of the vehicle roof and a second section is substantially equal to the height of the vehicle door, whereby the vehicle door is openable for access to an interior of the vehicle.

4. The wheel chair transport assembly according to claim 1, wherein said guide means are spaced from the roof and side of the vehicle by a plurality of evenly spaced brackets, in a number sufficient to support said carrier case when a wheel chair is loaded therein.

5. The wheel chair transport assembly according to claim 1, wherein said carrier case is a lightweight compartment of a size suitable for receiving a folded wheel chair therein, said carrier case including a door member at an end corresponding with a front end of the vehicle.

6. The wheel chair transport assembly according to claim 1, wherein said assembly is mounted on a portion of the vehicle behind a driver's seat thereby enabling operation of said assembly from the driver's seat of the vehicle.

7. A wheel chair transport assembly for a vehicle comprising:
a carrier case for housing a collapsible wheel chair;
a primary frame member having parallel opposed support beams spaced a predetermined distance apart and positioned transverse to a longitudinal direction of the vehicle;
means for removably mounting said primary frame member to the vehicle;
guide means for guiding said carrier case between an access position in contact with a ground surface and a storage position on the vehicle roof above said primary frame member, said guide means including a pair of opposed parallel guide rails respectively mounted on said pair of parallel opposed support beams of said primary frame member and mounted to the side of the vehicle parallel thereto;
means for controlling transfer of said carrier case between the access position and the storage position along said guide means, and discontinuation of said transfer when said carrier case is in the storage or access positions; and
means for indicating to an operator seated within the vehicle that said carrier case is in said storage position.

8. The wheel chair transport assembly according to claim 7, wherein said primary frame member further includes a pair of parallel spacer members positioned transverse to said support beams and in a longitudinal direction of the vehicle.

9. The wheel chair transport assembly according to claim 7, wherein said means for transferring includes an electrically operable winch assembly mounted adjacent the storage position of the carrier case for selectively raising and lowering said carrier case along said guide means.

10. The wheel chair transport assembly according to claim 7, wherein said carrier case includes a plurality of roller wheels mounted to a rear surface thereof in correspondence with a pair of opposed parallel guide rails, said plurality of roller wheels being rollable within the guide rails when said carrier case is guided between the access and storage positions.

11. The wheel chair transport assembly according to claim 7, wherein a distance between parallel opposed support beams of said primary frame member is adjustable to correspond to varying vehicle sizes and to carrier case sizes.

12. The wheel chair transport assembly according to claim 8, wherein said parallel spacer members are adjustable to correspond to varying vehicle lengths.

13. A wheel chair transport assembly, comprising:
   a pair of parallel track members mounted to a vehicle roof and to a side portion of the vehicle in conformity with to contours of the vehicles said track members being mounted transverse to a longitudinal direction of the vehicle;
   means for spacing said pair of parallel track members a predetermined distance from a surface of the vehicle roof and side portion of the vehicle;
   a case member for storing a folded wheel chair, said case member being mounted to and guided by said track members and contactable with a ground surface for direct access by an operator;
   means for raising and lowering said case member to positions on top of and adjacent a side of the vehicle along said track members; and
   means for actuating said means for raising and lowering by a driver seated within the vehicle.

14. A wheel chair transport assembly, comprising:
   a carrier case for housing a collapsible wheel chair;
   guide means mounted to and spaced a predetermined distance from a roof and one side of a vehicle for guiding said carrier case between an access position in contact with a ground surface and a storage position on the vehicle roof, said guide means conforming to exterior contours of the vehicle;
   a stop plate positioned at a terminal end of said guide means on the vehicle roof;
   a position indicator provided in connection with said stop plate, said position indicator being located within the vehicle and being responsive to contact pressure from said carrier case when said carrier case is in the storage position for indicating to an operator seated within the vehicle that said carrier case is securely stored; and
   means for transferring said carrier case between the access position and storage position along said guide means.

* * * * *